Dec. 6, 1966  J. S. BELL ETAL  3,290,046
FERTILIZER SPREADER
Filed March 30, 1964  5 Sheets-Sheet 1

Fig. 1

INVENTORS
JAMES S. BELL
KENNETH E. NELSON
BY
ATTORNEYS

Dec. 6, 1966     J. S. BELL ETAL     3,290,046
FERTILIZER SPREADER Filed March 30, 1964     5 Sheets-Sheet 3

INVENTORS
JAMES S. BELL
KENNETH E. NELSON
BY
ATTORNEYS

Dec. 6, 1966   J. S. BELL ETAL   3,290,046
FERTILIZER SPREADER
Filed March 30, 1964   5 Sheets-Sheet 4

INVENTORS
JAMES S. BELL
KENNETH E. NELSON
BY
ATTORNEYS

# United States Patent Office 3,290,046
Patented Dec. 6, 1966

3,290,046
FERTILIZER SPREADER
James S. Bell and Kenneth E. Nelson, Willmar, Minn.,
assignors to Willmar Manufacturing, Inc., Willmar,
Minn., a corporation of Minnesota
Filed Mar. 30, 1964, Ser. No. 355,572
11 Claims. (Cl. 275—6)

This invention relates generally to movable but non-automotive farm equipment of the trailer variety which is propelled and powered by some other apparatus such as a tractor or the like. In particular the invention is directed toward a new and improved fertilizer spreader constructed with a variety of features enabling it to be used for a variety of jobs normally encountered in rural or farm areas.

Heretofore the non-automotive fertilizer spreaders have been constructed in such a manner that they are only usable for the sole job of spreading fertilizer during the appropriate season. The result, of course, is that the equipment is used only a small time out of the year and the rest of the time sits idle. It is a principal object of this invention to provide apparatus having for its principal function the spreading of fertilizer for farm use but incorporating mechanisms making it readily adaptable for other uses, thereby increasing its versatility.

It is a further object of this invention to provide a fertilizer spreader for farm use which also may serve as a loader.

Most present-day fertilizer spreaders contain a conveyor belt at the bottom of a trailer-mounted hopper for discharging the material to be spread, with the conveyor belt being driven off the trailer wheels. The result is that when the spreader is stationary it cannot be used for discharging material from the hopper and at most can only be used for temporary storage of materials.

It is a further object of this invention to provide farm equipment of the nature described which can be used for farm type tasks even when it is stationary.

Yet another object of this invention is to provide a non-automotive trailer type farm equipment in which a conveyor belt carries and discharges material from a hopper to a distributing means with said equipment incorporating at least two different types of distributing means.

Still another object of this invention is to provide the type of equipment described with an improved motivating power driving system for the distributing means.

Yet another object of this invention is to provide improved means for driving the conveyor belt while the equipment is being moved.

A further object of this invention is to provide means for selectively driving the conveyor belt by the trailer mounting wheels while the equipment is being moved or by an external motivating power source, such as the trailer-pulling tractor, when the equipment is stationary.

In a device constructed according to the preferred embodiment of this invention, an endless belt conveyor is contained in the bottom of a hopper which carries the material, such as fertilizer, which is to be distributed. A pair of distributor fans or disks are detachably mounted at the external rear of the hopper to receive material discharged from the hopper by the conveyor belt and for distributing said material in a wide uniform pattern on the ground below. The hopper is detachably mounted to a wheel mounted frame and the conveyor belt is driven off the hub of one of the trailer wheels thereby eliminating the necessity of an intermediate friction wheel for driving the conveyor. Furthermore the conveyor belt is driven between its extremities thereby eliminating the necessity of an extended drive chain or belt running approximately the length of the hopper which heretofore has been a constant source of mechanical difficulty. The apparatus further includes a power take-off (p.t.o.) shaft for coupling motivating power from a tractor, which normally pulls the trailer-mounted spreader, toward the rear of the hopper to drive the distributing disks. An endless belt is interwoven amongst a plurality of pulleys in a manner to couple the motivating force to the distributing disks to eliminate substantially all slippage between the belt and the pulleys which heretofore has been encountered in machines of this nature. As a further function of the apparatus of this invention the distributing disks can be detached from the hopper and replaced with a loading auger which is driven from the same p.t.o. shaft used to drive the distributing disks. The driving pulleys for the auger are arranged in a manner such that the same belt used to interconnect the driving pulleys for the distributor disks can be used to intercouple the driving disks for the auger. The auger is mounted to receive the material discharged out the back of the hopper by the conveyor. Since loading would normally not be done while the trailer is being moved, the invention provides for selectively uncoupling the conveyor drive from the trailer mounting wheel and coupling it instead to the p.t.o. shaft so that the conveyor belt can be driven and used as a loader when the trailer is stationary.

As a further feature of this invention the hopper is detachably mounted to the frame so that the wheel mounted frame can be used for other purposes.

Besides having the distributor disks detachably mounted so as to permit attachment of a loading auger or other devices, the entire assembly for each of these distributing means, the auger and the disks, is detachably mounted to the hopper. In the event of mechanical difficulties or damage requiring extensive repair the respective units can be replaced as a separate entity with a new operative unit. Heretofore this has not been possible in equipment of this nature so that the equipment was substantially unusable when the distributing means was under repair.

These and other objects and features will become apparent during the course of the following detailed description with reference to the accompanying drawings in which.

Figure 1:
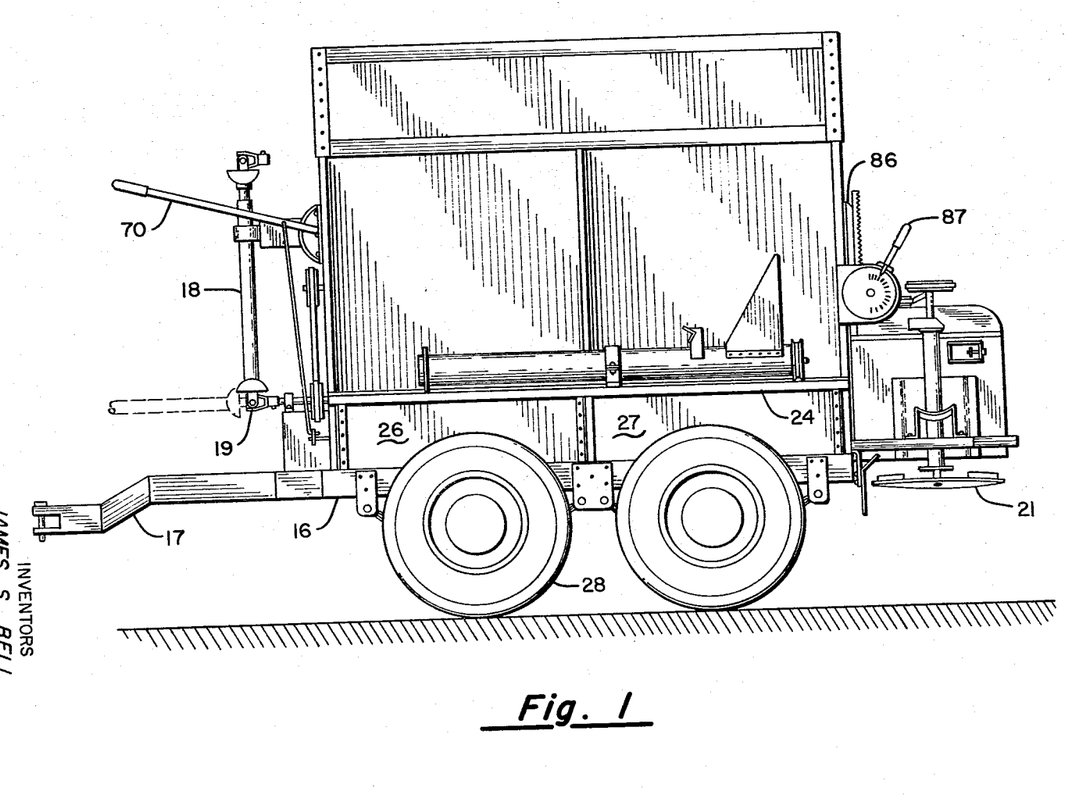
FIG. 1 is a left side view of a unit constructed according to the teachings of this invention.
Figure 2:
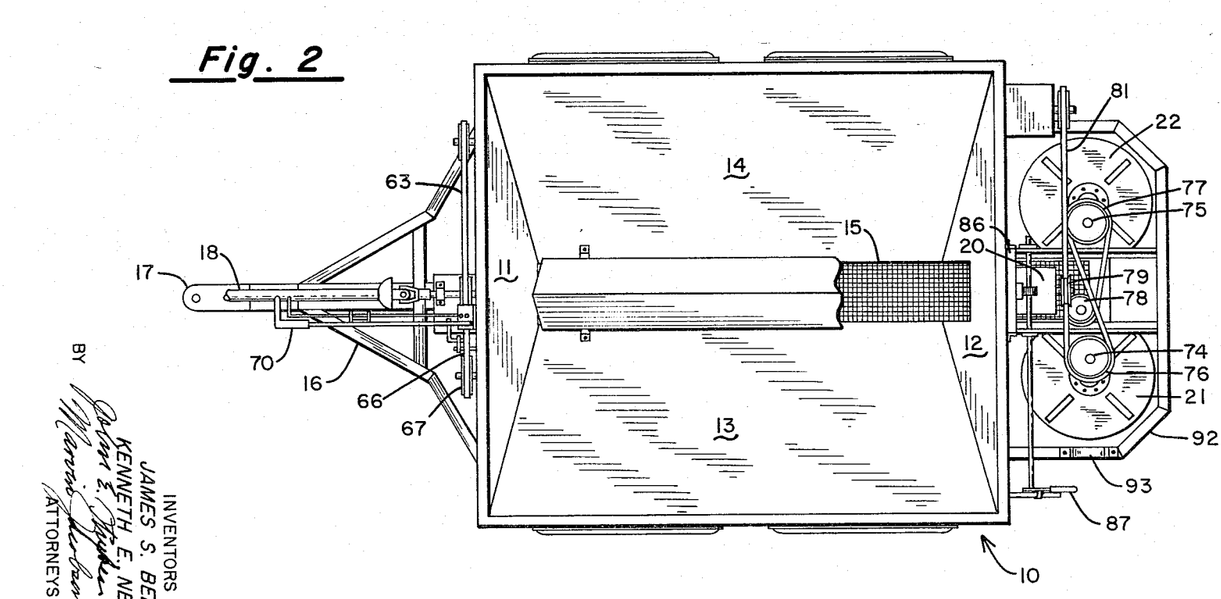
FIG. 2 is a top view of the same unit as FIG. 1 showing the interior of the empty hopper and the rear-mounted distributing fans.

Referring now principally to FIGS. 1 and 2, in order to set the invention in the right enviroment, some general overall description of the operation of the invention will be given. A hopper or bin 10 (sometimes referred to as a wagon box) having inward sloping, from top to bottom, front and rear walls, 11 and 12, respectively, as well as inward sloping left and right side walls, 13 and 14, respectively, and containing an endless conveyor belt 15 at the floor thereof is suitably mounted by any well-known means to a wheel-supported frame designated generally 16. The device constructed according to this invention is one in which the hopper is detachably mounted to the frame 16 so that the latter can be used for other hauling purposes if desired. Heretofore this feature has not been incorporated into fertilizer spreaders of this nature. The frame 16 is constructed with a forward extending portion at 17 for hitching to a pulling vehicle such as a tractor, not shown. A p.t.o. shaft 18 which is pivoted at 19 can be swung to a forward extending position as illustrated by the dashed line in FIG. 1 into engagement with a motivating power source in the tractor. When not in use the p.t.o. shaft is clamped out of the way in the upright position as shown in FIG. 1.

The driving mechanism for the endless belt 15 (which will be later described in detail) is arranged to cause the belt to convey the material contained in the hopper rearwardly and to discharge it out an opening shown generally at 20. Distributing means are detachably mounted to the rear of the hopper to receive the material discharged by the endless belt and to distribute it in the desired manner.

Figure 3:
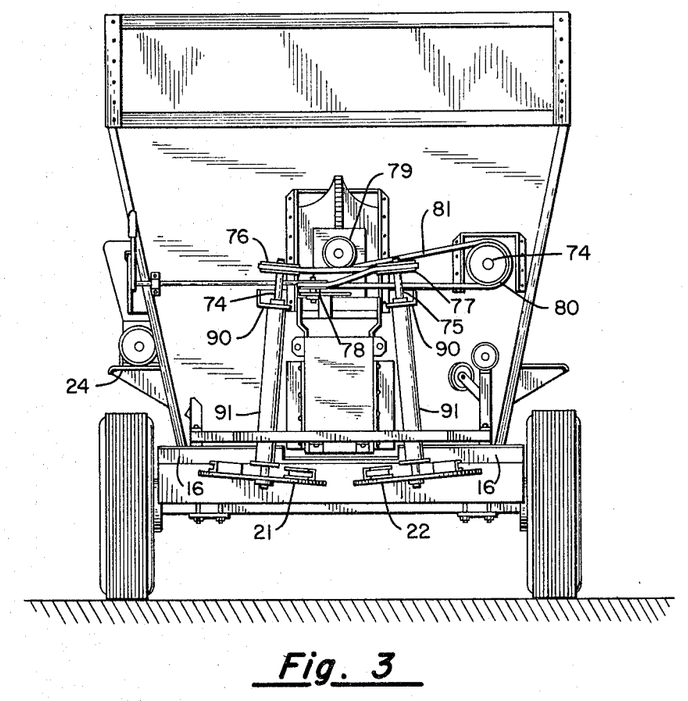
FIG. 3 is a rear view of the same unit as FIG. 2 showing a different view of the distributing fans.
Figure 4:
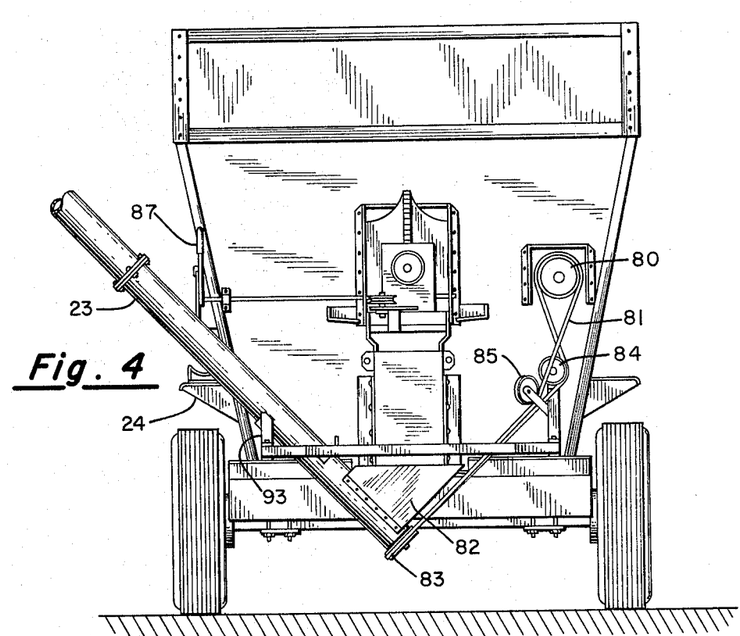
FIG. 4 is a rear view of the same unit with a loading auger mounted in operative position instead of the distributing fans.

In FIGS. 1, 2 and 3 the distributing means illustrated is apparatus for distributing fertilizer which is discharged from the hopper by spreading it over an area of the ground below as the trailer unit is being propelled by the tractor. This type of distributing means, which will be subsequently described in greater detail, incorporates pulley and belt driven distributing fans such as 21 and 22 located below the discharge chute of the hopper. When driven by a suitable motivating power source these fans spread the fertilizer over the ground in a uniform pattern. In FIG. 4 there is illustrated an alternate distributing means in the form of a loading auger 23 which receives the discharged material and conveys it up the cylindrical housing to be ejected into a storage facility, such as a silo or barn. As will be subsequently shown in detail, the distributing fans 21 and 22 along with their driving mechanisms can be readily detached from the hopper and replaced with the auger 23 and its driving mechanisms with a minimum of work to provide a feature heretofore not found in devices of this nature. As illustrated in FIGS. 1, 3 and 4, when not in use the auger 23 can be stored on a platform 24 which juts out from the left side of the hopper unit.

Figure 5:
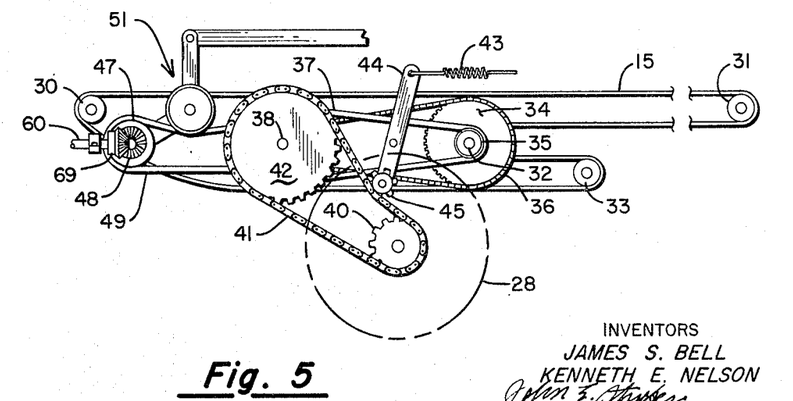
FIG. 5 is a left side view showing details of the drive mechanisms and linkages for the conveyor belt.

The driving mechanism and linkages for the conveyor belt are located generally below and to the left of the hopper and are normally blocked from view by cover plates 26 and 27 (FIG. 1). For the most part these linkages are located between the left front supporting wheel 28 and the conveyor belt. A left side view of the conveyor belt driving mechanisms with plate 26 removed is shown in FIG. 5.

CONVEYOR BELT DRIVE MECHANISM

At the front and rear extremities of the conveyor belt 15 are a pair of idler rollers, 30 and 31, respectively, which are suitably journaled to the hopper and maintain the conveyor belt in a relatively taut condition as the belt passes over and under the respective rollers. A similar type roller with cast teeth, not shown, is coaxially pinned to shaft 32 and drives the belt in a manner such that the upper reach of the belt travels rearwardly while lower reach travels in a forward direction. In order to ensure positive drive of the belt by the roller on shaft 32, an additional take-up roller or snub pulley 33 which is located below and rearward of the main drive roller, is incorporated into the driving mechanism. The belt passing over and under the main drive roller and continuing to pass over and under snub pulley 33 provides the means for developing a positive drive at the general center of the conveyor belt 15 thereby eliminating the necessity for a lengthy chain drive located external to the hopper and extending from the front to the rear thereof which has heretofore been required in devices of this nature. This latter type of drive being generally exposed to the elements and otherwise being quite susceptible to damage because of its excessive length, has in the past been a constant source of maintenance problems for the operators of fertilizer spreaders.

Pinned or keyed to shaft 32 are a pair of externally toothed driving gears 34 and 35 with the former having a substantially greater diameter than the latter. Chain 36 linked with the outer teeth of gear 34 drives the latter and chain 37 serves the same function with respect to gear 35. The other ends of these respective drive belts are linked to driving gears which are coaxially mounted on shaft 38. The operation of these drive gears will be subsequently described in greater detail.

The conveyor belt 15 can be driven through gear 34 or 35 from two different sources, one being the p.t.o. shaft which can be selectively coupled to the tractor, and the other is from the left forward ground engaging support wheel 28 which is shown in shadow line in FIG. 5. Coming off a toothed rim of hub 40 on wheel 28 is a drive chain 41 engaging the external teeth of driving gear 42 which is pinned or keyed to shaft 38. The combination of spring 43 attached to one end of lever arm 44 which is pivotally mounted to the main framework, along with toothed idler sprocket 45 which is attached by any convenient means to the other end of lever arm 44, insures a snug engagement of chain 41 to the teeth of the respective gears 40 and 42 to maintain a positive drive between the hub of the wheel 28 and gear 42 as the wheel rotates. Located forward of shaft 38 and substantially coplanar therewith is shaft 46 suitably journaled to the main frame. Pinned or keyed to shaft 46 is pulley 47 and bevel gear 48 for rotating the shaft. An endless V-belt 49 couples pulley 47 to a clutch pulley 50, which is more clearly shown in FIG. 6. There is also provided a belt-tightening mechanism at 51 which rides freely on shaft 46 for selectively tightening the belt drive between pulleys 47 and 50. When the mechanism 51 is in the loose position, pulleys 47 and 50 are substantially uncoupled from one another.

Figure 6:
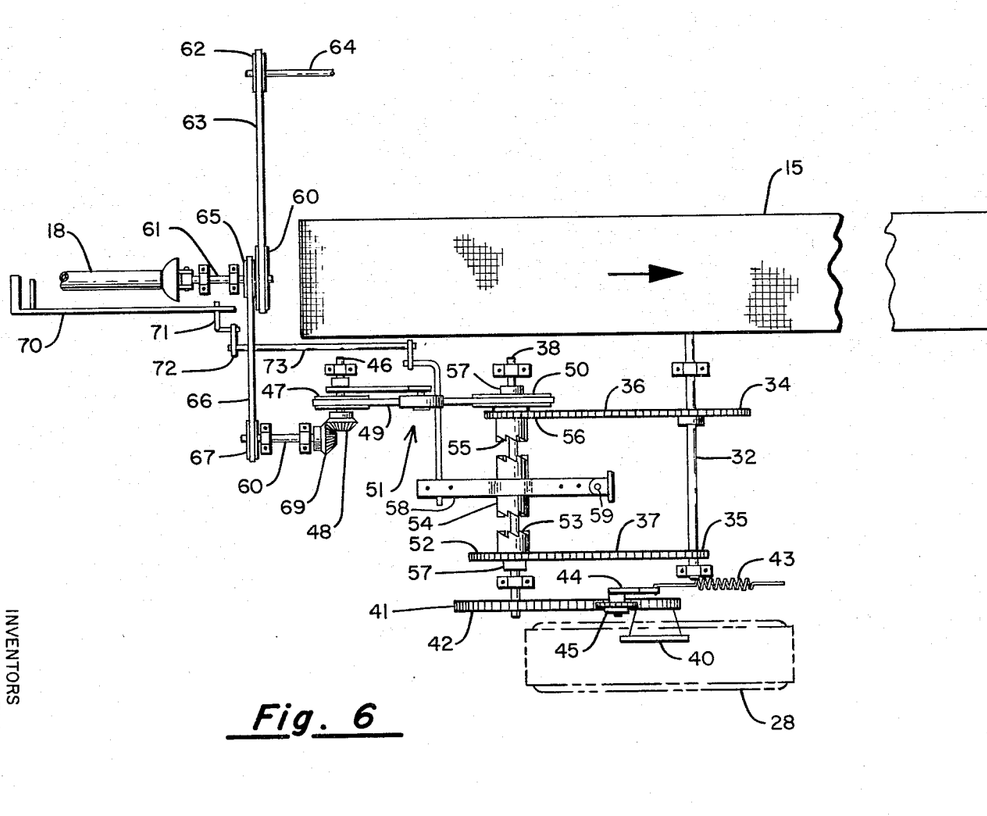
FIG. 6 is a top view showing details of the various driving linkages and mechanisms.

The relative placement of the gears and linkages lengthwise of shaft 38 is most clearly shown in FIG. 6. Moving along the shaft 38 inward from driving gear 42 there is another externally-toothed driving gear 52 which is loose fitting to rotate freely with respect to shaft 38. This gear is linked to smaller diameter gear 35 on shaft 32 by the chain 37. Formed integrally on the inner side of gear 52 is a separable coupling 53 in the form of a jaw clutch, shaped to link in a positive manner when desired with a corresponding portion of coupling 54 which is likewise coaxially mounted to shaft 38 but is keyed thereto. Continuing along shaft 38 inwardly, on the other side of coupling 54 is a similar jaw type clutch which is shaped to link with a correspondingly shaped coupling shown at 55. The latter is axially mounted on shaft 38 but is free to spin thereon and is an integral part of pulley 50 which is driven by V-belt 49 from pulley 47. A further integral part of both of these is externally-toothed gear 56 which is linked to the large diameter gear 34 mounted on shaft 32 by chain 36. By means which will be subsequently described in greater detail, coupling 54 can be selectively shifted laterally on shaft 38 to three different positions. When located at its furthest inward position, which will hereinafter be referred to as the slow speed position, it is coupled to jaw clutch 55 so as to impart to the latter any rotational motion of the shaft 38. When coupling 64 is located at its most outward position, the fast speed position, it is linked with jaw clutch 53 so as to impart through the latter onto gear 52 any rotational motion of shaft 38. The neutral position of coupling 54 is intermediate the fast and slow speed positions where it is disengaged from the mating couplings.

A plurality of spacers or bushings, such as 57, are pinned or attached by set screws to shaft 38 to limit the lateral motion of the gears and pulleys mounted on shaft 38.

CONVEYOR BELT DRIVE OPERATION

The general operation of the driving mechanisms for the conveyor belt 15 will now be described assuming that the coupling 54 is initially positioned in the fast drive location so that it is linked with jaw clutch 53 to drive gear 52. As the supporting wheel 28 rotates along with its hub 40, gear 42 is driven by chain 41 and since the latter gear is keyed to shaft 38 the latter is caused to rotate about its axis. Because coupling 54 is also keyed to shaft 38, it rotates with the latter in the same manner to drive gear 35 via linkage with gear 52 through chain 37. Gear 35 being pinned to shaft 32, causes the latter to rotate about its axis to drive the conveyor belt rearwardly in the hopper. It should be noted that because of the ratio of the diameters of gears 52 and 35 there is a step-up of speed of rotation from shaft 38 to shaft 32.

When coupling 54 is engaged with the jaw clutch 55 in the slow speed position, the rotation of wheel 28 which is imparted to shaft 38 via gear 42 is coupled to drive gear 56 which is linked to externally toothed gear 34 via belt 36. The latter gear, in turn, being keyed or otherwise attached to shaft 32 causes rotation of said shaft and through the drive roller, not shown, drives the upper reach of conveyor belt 15 rearwardly. The dimensional ratio of gear 34 to gear 56 results in a step down of the speed of rotation of shaft 32 to that of shaft 38 with the resulting slower speed of the conveyor belt than when driven by the previously described linkages.

When coupling 54 is positioned in the neutral position, no rotation of the wheel 28 can be imparted to the conveyor belt driving shaft 32 from shaft 38 even though the latter shaft does rotate since coupling 54 is not engaged with any of the drive gears.

P.T.O. DRIVE

Figure 7:
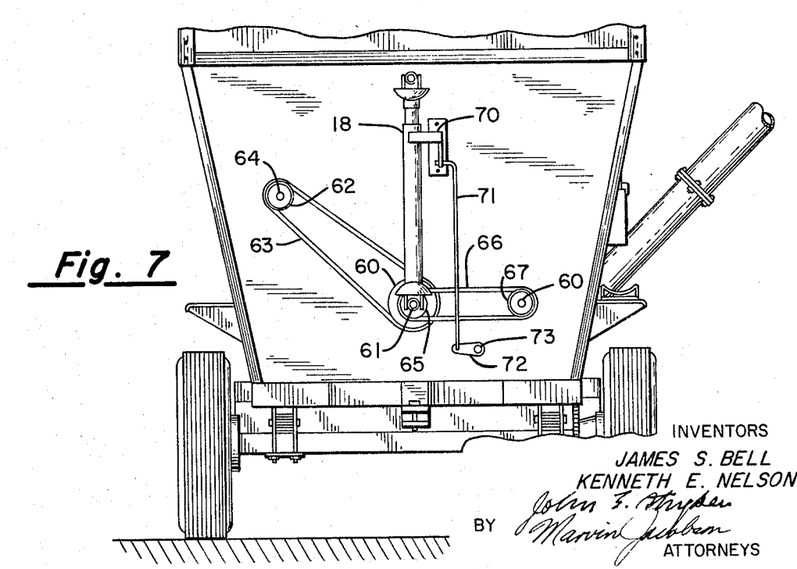
FIG. 7 is a front view of the unit shown in FIG. 1.

Referring now to FIG. 7, the mechanisms for coupling the p.t.o. shaft to the devices to be driven as well as the means for selectively choosing and setting the drive speed for the conveyor belt will be described in detail. The motivating power which is provided by the p.t.o. shaft from the tractor serves a dual purpose. When the apparatus is being utilized for spreading fertilizer the power is coupled from the p.t.o. shaft 18 located in front of the bin or hopper rearwardly to drive the distributing fans. When it is desired to utilize the apparatus of the instant invention for loading purposes, that is for unloading material from the hopper and placing it into storage such as in a silo or barn, the motivating power from the p.t.o. shaft is coupled rearwardly to drive the loading auger and furthermore is coupled to drive the conveyor belt 15. In this way supporting wheel 28 does not have to rotate and the apparatus can be used advantageously even though it is stationary. In FIG. 7 the p.t.o. shaft 18 is shown in the lifted, inoperative position for clarity, but in normal use it extends forward in a generally horizontal plane and is mechanically coupled to the tractor engine. Pulley 60 is coaxially attached along with the p.t.o. shaft 18 to the short drive shaft 61 which is suitably journaled to the main support frame. Drive pulley 60 is linked to pulley 62 through V-belt 63. Pulley 62 is keyed or otherwise attached to an elongated drive shaft 64 which extends rearwardly the length of the hopper to the distributing unit along the outside of the hopper to provide the driving power for distributing means. Mounted coaxially with pulley 60 on shaft 61 is another pulley 65 which is linked by the rightward extending V-belt 66 to the driven pulley 67. The latter is attached to shaft 68 and in turn drives bevel gear 69 which mates with and drives bevel gear 48 on shaft 46 (FIG. 5). Whenever the p.t.o. shaft is engaged with the tractor engine or other driving mechanism, rotational power is transferred rearwardly to the distributing means and rightwardly through the pulley V-belt combination and bevel gears to drive pulley 47 (FIG. 5). However, the latter path will only be effective to transfer this motive power to drive the conveyor belt 15 if the V-bell tightening unit 51 is positioned so that the V-belt 49 positively drives pulley 50. When this is achieved the p.t.o. motivating power is transferred through pulley 50 and gear 56 via chain 36 to gear 34 to drive the upper reach of the conveyor belt rearwardly as previously described.

Extending forwardly from the hopper is an elongated lever arm 70 which is pivotally mounted to the hopper and is linked by rod 71 to arm 72 which in turn is attached to rod 73 to rotate the latter about its axis. Further linkages couple rotational motion of rod 73 through a suitable holding mechanism 58 which is pivotally attached to the main frame at 59, to coupling 54 to provide the means for selectively laterally positioning the latter as desired along shaft 38 as previously described. When lever arm 70 is swung to its furthest downward position the linkage operates to position coupling 54 into the slow speed position and when lever arm 70 is in its uppermost position coupling 54 is in the fast speed position. Intermediate these two extremities the lever arm 70 positions coupling 54 in a neutral position.

In general, when the trailer-mounted hopper is being pulled by a tractor and the p.t.o. shaft 18 is coupled thereto, lever arm 70 is either in the fast or slow speed position so that conveyor belt 15 is being driven by the wheel 28 to supply material at the desired rate of the distributing fans located at the rear of the hopper. Of course, if it is desired not to distribute any of the material which might be contained in the hopper, lever arm 70 may be positioned in the neutral position. In any event, as long as the unit is being pulled, the tightening mechanism 51 for V-belt 49 is not in play so no motivating power from the external p.t.o. shaft is being coupled to drive the conveyor belt. When the unit is stationary and it is desired to unload material from the hopper and store it or otherwise convey it away through the auger, lever arm 70 is positioned in the neutral position and the tightening mechanism 51 is brought into play so that the power from the p.t.o. shaft 18 is coupled from pulley 47 through the driving mechanisms previously described to drive the conveyor belt 15. It should be noted that in the latter case, even though the rotation of gear 34 is coupled to gear 35 via shaft 32 and backward therefrom through chain 37 to gear 52, since the latter floats freely on shaft 38, it rotates on the latter without any harmful results. However, the importance of lever arm 70 being in the neutral position when the p.t.o. shaft is providing the motivating power for the conveyor belt should be pointed out. If the lever arm 70 is in other than neutral, the power from the p.t.o. shaft would be coupled to shaft 38 by coupling 54 which is keyed to the latter shaft and this, in turn, would attempt to drive gear 52 which is likewise keyed to shaft 38. Since the latter gear is also chained to the now stationary wheel 28 there would likely result damage to some of the mechanisms. This possibility can be eliminated by constructing the coupling or the pulleys or both as friction clutches so that when encountering the torques developed during this abnormal operation, the clutch will slip to prevent the occurrence of any damage. It has been found that the mating jaw faces of couplings 54 and 55 will respond to this abnormal action by slipping out of engagement in overcoming the springlike forces in some of the linkage. Continuous operation in this manner, however, is not recommended.

DISTRIBUTOR DRIVE

Driving mechanisms for the distributor fans located at the rear of the hopper will now be described in detail with particular reference to FIGS. 2 and 3. The distributor fans 21 and 22 are attached to one end of their respective drive shafts 74 and 75 at a slant to the horizontal. The fans are located with respect to the discharge opening at the rear end of the hopper (to which the conveyor belt 15 conveys the material being discharged) so as to spread the discharged material in the most efficient manner to provide the most uniform pattern. Shafts 74 and 75 are respectively driven by pulleys 76 and 77 which are attached at their other ends. The driving linkage is completed by a horizontally disposed idler pulley 78, a vertically disposed idler pulley and a vertically disposed input drive pulley 80 which is attached at the rear end of the elongated drive shaft 64 which is powered by the p.t.o. shaft. An endless V-belt 81 couples the rotational power from pulley 80 to pulleys 76 and 77. The somewhat serpentine path of the V-belt 81 can be traced starting from the top of the input power pulley 80 angled downward into engagement with pulley 76. Idler pulley 79 guides the belt to ensure that the belt does not slip upward out of engagement in the V-groove of pulley 76. The belt makes a complete 180° turn around pulley 76 to provide a secure frictional engagement therewith and then runs in a substantially horizontal plane to engage pulley 77. The belt follows a path which crosses over an imaginary line drawn in a horizontal plane between the axes of the two pulleys. The belt then makes a loop of at least 180° around pulley 78 which directs the V-belt back toward the input drive pulley 80. In tracing this path, it can be seen that the belt makes at least 180° of contact in its coupling engagement with the input drive pulley 80 as well as the drive pulleys 76 and 77 for the respective distributor fans. This eliminates to a substantial degree the slippage problems previously encountered in machines of this nature which provided substantially less mating surfaces between the driving belt and the driven pulleys.

With particular reference to FIG. 4, there will now be described the operation and the driving mechanisms for distributing the material discharged from the hopper using a loading auger 23. As illustrated in FIG. 4, the distributing fans along with the drive mechanisms and linkages have been removed and replaced with loading auger 23. A suitable support framework for the auger 23 is provided and the latter is mounted thereto by brackets and bolts which are not considered part of this invention and which can be easily incorporated by one of ordinary skill in the art. Suffice it to point out that the inlet opening into the bottom of the cylindrical auger, indicated in the area of 82, must be located with respect to the discharge opening at the bottom and the rear of the hopper to receive all of the material being transferred thereto by the conveyor belt 15. As previously stated, in general, the trailer will be stationary in this use so that the p.t.o. shaft is providing the power to drive the conveyor belt 15. At the bottom of the cylindrical housing of the auger is an axially mounted rotatable drive pulley 83. A pair of directional idler pulleys 84 and 85 oriented in a substantially vertical plane are suitably mounted to the framework and are rotatable about their respective axes. The same V-belt 81 which intertwines amongst the pulleys for driving the distributor fans couples the input power pulley 80 to the auger drive pulley 83. One reach of the belt 81 coming downward off pulley 80 is directed by pulley 85 leftward and downward into frictional engagement with pulley 83. After a 180° loop in contact with the latter the belt continues back upward and is directed and guided by pulley 84 back to the input power pulley 80.

The ease with which the two illustrated types of distributing means can be attached to the hopper for use should be pointed out as a feature of this invention which makes it practicable as a versatile device for farm use. All that is required to support the distributing means is a framework of sufficient strength which can be bolted at strategic points to the hopper or the frame. Although the figures do not illustrate details of the structure, it is apparent that steel brackets, such as at 90 (FIG. 3), for support of shafts 74 and 75 can be bolted or otherwise be detachably anchored to the hopper. Lower supports in the form of brackets or the like can be readily attached to the trailer frame in the area indicated by 91. An outer beam type structure, such as 92 (FIG. 2) which may be welded or otherwise attached to the frame or hopper, provides additional support such as a holding bracket at 93 for the auger. To replace the distributing fans with the auger, all that need be done to remove the former is to remove a few attaching bolts and disengage the V-belt 81. The auger can then be positioned in its bracket 93 and a few attaching bolts tightened down and the V-belt 81 engaged.

There is provided, in the usual manner, a door 86 at the rear of the hopper which is slidable up and down under control of lever arm 87 to adjust the discharge opening through which the material is delivered to the distributing means. The additional versatility of the unit incorporating this invention becomes apparent by considering the possible variations in the degree of fertilizing that can be effected by the combined adjustments of the discharge opening by lever arm 87 and the selective two speed control by lever arm 70 when the conveyor belt 15 is being driven by the supporting wheel.

GENERAL OPERATION

When used as a fertilizer spreader the hopper is filled with the required amount of dry fertilizer material depending on the acreage to be fertilized. The discharge opening is adjusted by lever arm 87 and the conveyor belt speed selection is made by the suitable positioning of lever arm 70. The tractor to which the trailer mounted hopper is attached starts pulling the latter across the field with the power take-off shaft 18 engaged to drive the attached distributing fans. A control test is run at a suitable speed and the pattern of distribution of the fertilizer can be checked and suitable adjustments made in the discharge opening, and, if necessary, the speed of the conveyor belt may be adjusted from fast to slow or vice versa. When the optimum conditions have been chosen and set, the spreading of the fertilizer is continued until the entire field is covered or until additional fertilizer must be loaded into the hopper. If for certain sections of land it is desirable to increase the degree of fertilization, in addition to increasing the discharge opening, the conveyor belt speed control can be changed from slow to fast so that the fertilizer is discharged at a faster rate.

For auxiliary use in transporting and loading material, for example, taking grain or the like for livestock feed from the field and loading it in a silo, the trailer mounted hopper is hauled out to the field (with the conveyor belt drive disconnected by placing lever arm 70 in the neutral position) and the grain is loaded into the hopper. It is then hauled back to the storage silo and the auger 23 is mounted substantially as illustrated in FIG. 4. The discharge opening from the auger is directed into the intake of the silo and the intake opening to the auger is located under the hopper discharge opening. The p.t.o. shaft 18 is coupled to the tractor and the driving power from the p.t.o. shaft is coupled to the drive conveyor belt 15. The material is conveyed out of the hopper and passes into the inlet opening at the bottom of the auger and the conveying mechanism in the latter conveys the material up through the cylindrical housing of the auger and into the silo as the drive pulley 83 rotates.

What is claimed is:

1. In combination: a wagon box mounted on a supporting frame; ground engaging supporting wheels mounted to the sides of said frame; a horizontally disposed conveyor belt extending from front to back along the bottom of said box for conveying material and discharging it out the back end of the box; means coupled to said conveyor belt for driving said belt in a continuous manner; a shaft extending generally orthogonal to a supporting wheel; first coupling means movably mounted on said shaft for transmitting driving power from said wheel to said conveyor belt driving means when in the engaged condition; means detachably mounted to the outer back end of said wagon box for receiving and distributing the material discharged by said conveyor; means for rotationally driving said latter means; a motive power source located in front of said wagon box; transmission means for coupling said source to said rotational driving means; and means for selectively coupling said motive power source to said conveyor belt driving means while slidably disengaging said first coupling means.

2. Apparatus as in claim 1 wherein said distributing means comprises at least a pair of substantially horizontally disposed distributing fans for spreading material discharged by said conveyor and a lifting auger for loading said discharged material, each of said distributing means being mutually exclusively operably attachable to said wagon box and driven by the same rotational driving means.

3. In combination: a wagon box mounted on a supporting frame; ground-engaged supporting wheels mounted to the sides of said supporting frame; a horizontally disposed conveyor belt running from front to back contained in the bottom of said wagon box for conveying material and discharging it out the back end of the box; means engaged with said conveyor belt intermediate its front and back ends for driving said belt; a shaft extending generally orthogonal to a supporting wheel; first coupling means movably mounted on said shaft for transmitting driving power to said conveyor belt driving means from the supporting wheel when in the engaged condition; horizontally disposed distributor fan means detachably mounted on the outer back end of the wagon box for receiving the material from the conveyor and spreading it on the ground below; vertically disposed shaft means attached to said fan means for rotationally driving same; a motive power source located in front of said wagon box; transmission means coupling said source to said fan shaft means for rotating the latter at selective velocities to thereby control the extent of spreading of the material by the fan means; and means for selectively disengaging said first coupling means while coupling said motive power source to said conveyor belt driving means.

4. In combination: a hopper detachably mounted to a substantially horizontal supporting frame; ground engaging supporting wheels mounted to the sides of said frame; a horizontally disposed conveyor belt extending from front to back along the bottom of said hopper for conveying material and discharging it out the back end of the hopper; roller means coupled to said conveyor belt intermediate the front and back ends for driving said belt, the axis of rotation of said roller means being substantially parallel to the axis of rotation of said supporting wheels; selectively engageable means for coupling the axle of one of said supporting wheels to said roller means for rotatingly driving said roller means by said one supporting wheel when in the engaged condition; rotatable means detachably mounted to the outer back end of said hopper for receiving and distributing material discharged to said conveyor belt; pulley means for rotationally driving said latter means; a motive power source located in front of said hopper; shaft means coupling said motive power source to said pulley means; and means for selectively coupling said motive power source to said conveyor belt roller while disengaging said supporting wheel coupling means.

5. In combination: a horizontally disposed support frame having ground-engaging support wheels mounted on its sides; a hopper detachably mounted to said frame; a horizontally disposed conveyor belt extending from front to back along the bottom of said hopper for conveying material contained in the hopper and discharging it out the back end of the hopper; roller means coupled to said conveyor belt between the ends for driving said belt, the axis of rotation of said roller means being substantially parallel to the axis of rotation of at least one of said support wheels; first and second rotatable means for receiving and distributing the material discharged by said conveyor; means for mutually exclusively detachably mounting said first and second distributing means to the outer back of said hopper; a distributor drive input pulley at the outer back of the hopper attached in a vertical plane to the end of a rotatable elongated shaft extending to the front of said hopper; first and second groups of additional pulleys for respectively rotating said first and second distributing means; a V-belt for interchangeably coupling said first and second pulley groups to said input pulley; an input power takeoff shaft located at the outer front of the hopper for providing motive power from an external source; means for coupling said power takeoff shaft to said elongated shaft to thereby drive said distributor drive input pulley; and means for selectively mutually exclusively coupling the axle of said at least one propelling wheel and said power takeoff shaft to said roller means for driving said conveyor belt.

6. The combination as in claim 5 wherein said first and second distributing means are respectively spreading means for scattering the material over the ground and auger means for conveying and stacking the material.

7. The combination of claim 5 wherein said first group of additional pulleys comprises: a pair of substantially horizontal, spaced-apart distributor driving pulleys and additional idler pulleys all arranged in a manner such that when coupled to the drive input pulley the V-belt makes at least 180° contact with each of said driving pulleys.

8. In apparatus of the nature described having a conveyor belt in the bottom of a wheel-mounted hopper for discharging material out the back end of the hopper and means driven by a forwardly located external power takeoff shaft for distributing the discharged material: roller means coupled to the conveyor belt intermediate the ends thereof for driving said belt, said roller means being normally powered by one of the mounting wheels; and means for selectively coupling the power takeoff shaft to said roller means while disengaging the mounting wheel power therefrom.

9. In apparatus of the nature described having a conveyor belt in the bottom of a wheel-mounted hopper for discharging material out the back end of the hopper and means driven by a forwardly located external power takeoff shaft for distributing the discharged material: roller means engaged with the conveyor belt intermediate the ends thereof for driving said belt; means for driving said roller means from said power takeoff shaft; means for driving said roller means from one of the mounting wheels; and manually operable means for selectively mutually exclusively coupling each of said driving means to said roller means.

10. The invention as described in claim 9 wherein said means for driving the roller means from the mounting wheel includes manually adjustable coupling means for selectively changing the relative velocity at which the roller means is driven by the mounting wheel.

11. In apparatus of the nature described having a conveyor belt in the bottom of a wheel-mounted hopper for discharging material out the back end of the hopper and means driven by a forwardly located external power takeoff shaft for distributing the discharged material: roller means engaged with the conveyor belt intermediate the ends thereof for driving said belt, the axis of rotation of said roller means being substantially parallel to the axis of rotation of at least one of the support wheels; a shaft extending generally parallel to the axis of rotation of said roller means and spaced apart therefrom; means for transmitting the rotating motion of one of the mounting wheels from its axle to said shaft; means for transmitting the wheel rotating motion from said shaft to said roller means for causing the roller means to rotate about its axis of rotation; coupling means movably mounted on said shaft for transferring the wheel rotating motion to the roller means only when in engaged condition; and means for selectively engaging the power take-off shaft with said roller means while disengaging said coupling means.

References Cited by the Examiner

UNITED STATES PATENTS

| | | | |
|---|---|---|---|
| 1,706,501 | 3/1929 | Smith | 198—203 |
| 2,804,308 | 8/1957 | Neighbor et al. | 275—5 |
| 3,085,807 | 4/1963 | Tyler | 275—8 |
| 3,142,490 | 7/1964 | Tift et al. | 275—6 X |

ABRAHAM G. STONE, *Primary Examiner.*

WILLIAM A. SMITH III, *Examiner.*